I. E. LITTEN.
TRAILER CONNECTION.
APPLICATION FILED DEC. 20, 1918.
1,356,076.
Patented Oct. 19, 1920.
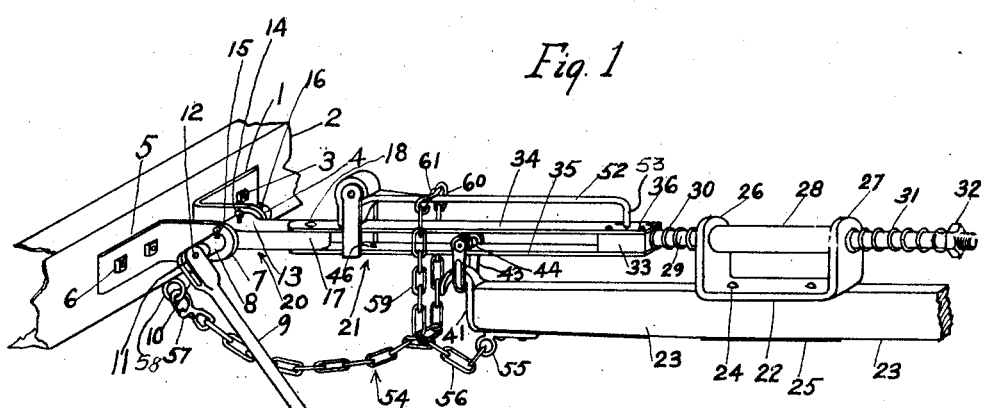
INVENTOR.
Ira E. Litten.
BY Hazard & Miller
ATTORNEY.

UNITED STATES PATENT OFFICE.

IRA E. LITTEN, OF ORANGE, CALIFORNIA.

TRAILER CONNECTION.

1,356,076. Specification of Letters Patent. Patented Oct. 19, 1920.

Application filed December 20, 1918. Serial No. 267,691.

*To all whom it may concern:*

Be it known that I, IRA E. LITTEN, a citizen of the United States, residing at Orange, in the county of Orange and State of California, have invented new and useful Improvements in Trailer Connections, of which the following is a specification.

My object is to make an improved trailer connection, and my invention consists of the novel features herein shown, described and claimed.

Figure 1 is a perspective of a trailer connection embodying the principles of my invention, the tractor and trailer being broken away.

Fig. 2 is a perspective of the tractor member of the trailer connection and showing the member in the position it occupies when out of use or disconnected from the trailer member.

Fig. 3 is a fragmentary perspective of the trailer member of the trailer connection with the parts in the position they occupy when out of use or disconnected from the tractor member.

Fig. 4 is a fragmentary sectional detail on the line 4—4 of Fig. 2.

Fig. 5 is an enlarged vertical cross section on the line 5—5 of Fig. 3.

Fig. 6 is a sectional detail on the line 6—6 of Fig. 4.

Fig. 7 is an enlarged cross sectional detail of the cam.

Fig. 8 is a fragmentary bottom plan view looking in the direction indicated by the arrow 8 in Fig. 3.

Referring to the drawing in detail, the attaching plate 1 is adapted to be secured to the body 2 of the tractor by bolts 3. A bearing 4 extends backwardly from the inner end of the plate 1. The attaching plate 5 is likewise secured to the body of the tractor by bolts 6, and the bearing 7 extends backwardly from the inner end of the plate 5. The plate 1 and the bearing 4 are formed of a heavy piece of strap iron bent at right angles, and the attaching plate 5 and the bearing 7 are formed in the same way. The openings in the bearings 4 and 7 are in a transverse horizontal line. The pin 8 fits loosely in the bearings 4 and 7. A handle 9 has a bifurcated end 10 to fit the flattened end 11 of the pin 8, and a hinge pin 12 connects the parts together.

The bearing 13 fits between the bearings 4 and 7, and the pin 8 extends through the bearing 13. A cotter 14 is inserted downwardly through the bearing 13 and through the pin 8 to hold the pin from turning in the bearing. Cotters 15 and 16 are inserted downwardly through the pin 8 outside of the bearings 7 and 4 to hold the pin from shifting endwise. The drawplate 17 extends from the bearing 13, and bearing lugs 18 and 19 extend from the side faces of the plate 17 in alinement so as to serve as a coupling pin. The parts 1 to 19 constitute the tractor coupling member 20. The drawplate 17 extends from the pin 8 in the same direction as the handle 9, when the member is uncoupled and hanging freely, as in Fig. 2. The handle 9 serves as a means for swinging the drawplate 17 to a horizontal position when making the coupling, otherwise the handle 9 swings freely upon the pin 12.

The details of the trailer coupling member 21 are as follows:

The supporting plate 22 fits downwardly against the trailer tongue 23, and bolts or rivets 24 are inserted through the plate 22 and the trailer tongue 23 and through a washer plate 25 which is on the bottom of the tongue to hold the plate 22 rigidly in place upon the tongue. The plate 22 is forged from a heavy piece of iron and the ends of the iron are bent upwardly at right angles to form the bearings 26 and 27. A sleeve 28 is inserted through the bearings 26 and 27 and riveted or welded in place to make a long bearing. The round rod 29 is slidingly mounted through the sleeve 28, there being an expansive coil spring 30 upon the rod against the outer face of the bearing 26, and an expansive coil spring 31 upon the rod against the outer face of the bearing 27, and a nut 32 upon the rear end of the rod 29. A flat head 33 is forged upon the forward end of the rod 29. Long, heavy spring plates 34 and 35 are placed against the upper and lower faces of the head 33 and secured in place by rivets 36, and the plates extend forwardly in substantially parallel planes, there being alined coupling pin openings 37 and 38 through the forward ends of the plates to receive the bearing lugs 18 and 19. The plates 34 and 35 are set to spring apart when released, as shown in Fig. 3, so that the bearing lugs 18 and 19 will readily pass between the ends of the plates to make the coupling. An attaching plate 39 is secured to the lower face of the forward end of the tongue 23 by rivets 40. A hook 41 extends upwardly from the forward end of the plate 39 against the forward end face of the tongue, the lower face 42 of the hook being round in cross section, as in Fig. 5. A D-shaped clevis 43 fits the hook 41, and the clevis pin 44 passes over the plate 34 and when the plates 34 and 35 are released, as in Fig. 3, the plate 35 springs downwardly from the clevis pin 44, as shown in Fig. 5. The curved portion of the clevis 43 is substantially concentric to the axis of the rod 29, so that when the tractor and trailer rock sidewise relative to each other, the rod 29 may turn in the sleeve 28 and the clevis turn upon the hook 41.

The shackle plate 45 is secured to the lower face of the plate 35 by rivets 46, and the shackle arms 47 and 48 extend upwardly from the ends of the plate 45 past the edges of the plates 34 and 35. The cam bearing 49 fits between the upper ends of the shackle arms 47 and 48, and a pin 50 is inserted through the ends of the shackle arms and through the bearing 49. The cam 51 is formed upon the bearing 49 and the handle 52 extends from the bearing and cam. The handle 52 is substantially at right angles to the cam 51, so that when the handle 52 swings upwardly the plates 34 and 35 are released to spring apart and uncouple the trailer from the tractor, and so that when the handle 52 is swung downwardly to a horizontal position, as in Fig 1, the cam 51 passes the center of the pin 50 and draws the plates 34 and 35 together to bring the bearing lugs 18 and 19 into the openings 37 and 38 and make the coupling.

The bearing 49, cam 51 and the handle 52 are forged from a single piece of iron, the end of the iron being flattened and bent to form a substantially circular eye 49', and a sleeve 50' may be inserted tightly into the eye to form a good bearing for the pin 50. The metal extends outwardly from one end of the bent portion to form the cam arm 51', and then the metal is bent backwardly to form the second cam arm 52', thus producing a cam that is V-shaped in cross section, as in Fig. 7. The outer end of the cam arm 52' is bent against the opposite side of the eye 49' from the outer end of the arm 51', and then the handle 52 extends outwardly at an angle of a little more than 90° relative to the cam arm 51'. The point 53' rides upon the upper face of the plate 34 and serves as an eccentric to move the plate 34 away from the bearing pin 50 to make the coupling.

The free end of the handle 52 is bent at right angles to form the spacer 53 to engage the upper face of the plate 34 and hold the body of the handle away from the plate, so that the handle may be easily grasped by passing the fingers through the space between the handle and the plate. When the plates 34 and 35 are drawn together, as in Fig. 1, the plate 35 presses upon the clevis pin 44, so that the clevis 43 holds the forward portion of the coupling member 21, and avoids the liability of bending the rod 29. The coupling member 21 may move forwardly or backwardly, relative to the tongue, under the strain of a load, and the springs 30 and 31 will yield and make spring buffers. At this time the plate 34 will slide upon the clevis pin 44.

It is important that the handle 9 be hingedly connected to the pin 8, so that when the tractor turns relative to the trailer the handle may swing, otherwise it would collide with the trailer coupling member.

The safety device 54 is supplemental to the coupling and consists of an eye 55 secured to the forward end of the tongue 23, a chain 56 secured to the eye, a snap 57 at the forward end of the chain, an eye 58 secured to the tractor to be engaged by the snap 57, chains 59 and 60 secured to the chain 56 and adapted to extend upwardly over the handle 52, and a snap 61 upon the chain 60 and adapted to engage a link of the chain 59. The chain 56 is long enough to be loose when the coupling is made, and the chains 59 and 60 connected together by the snap 61 hold the handle 52 down and prevent the liability of the handle flying upwardly and allowing the coupling member to become disconnected. If any part of the coupling member breaks or the coupling is disconnected in any way, the chain 56 will pull the trailer and the chains 59 and 60 connected by the snap 61 will guide the trailer so as to prevent an accident on a hill, or the like, due to the coupling breaking.

Various changes may be made without departing from the spirit of my invention as claimed.

I claim:

1. In a trailer connection, the combination with a trailer tongue, a draw bar including a pair of superimposed blades mounted on said tongue, and means for coupling the forward ends of said blades to another vehicle, of a hook secured on the forward end of said tongue and extending outwardly therefrom, and a clevis adapted to be engaged by said hook including a pin extending transversely between said blades and forming a support for the draw bar forwardly of its mounting on said tongue.

2. In a trailer connection, the combination with a trailer tongue, a draw bar including a pair of superimposed blades mounted on said tongue, and means for coupling the forward end of said blades to another vehicle; of means for connecting one of said blades to the forward end of said tongue for supporting the draw bar forwardly of its mounting on said tongue.

In testimony whereof I have signed my name to this specification.

IRA E. LITTEN.